(12) United States Patent
Brethour (10) Patent No.: US 8,666,026 B1
(45) Date of Patent: Mar. 4, 2014

(54) SYSTEMS AND METHODS FOR PROVIDING NOTIFICATIONS OF HAZARDOUS GROUND CONDITIONS IN TELECOMMUNICATION EQUIPMENT

(75) Inventor: Vernon R. Brethour, Owens Cross Roads, AL (US)

(73) Assignee: ADTRAN, Inc., Huntsville, AL (US)

( * ) Notice: Subject to any disclaimer, the term of this patent is extended or adjusted under 35 U.S.C. 154(b) by 182 days.

(21) Appl. No.: 12/962,383

(22) Filed: Dec. 7, 2010

(51) Int. Cl.
*H04M 1/24* (2006.01)
*H04M 3/08* (2006.01)
*H04M 3/22* (2006.01)

(52) U.S. Cl.
USPC ..... 379/9.06; 379/1.01; 379/9.04; 379/29.03; 379/29.1; 361/1

(58) Field of Classification Search
USPC ............... 379/1.01, 9.02, 9.06, 27.01, 29.03, 379/29.04, 29.1, 32.01, 93.05, 93.06, 412, 379/437, 451, 9.04; 361/1
See application file for complete search history.

(56) References Cited

U.S. PATENT DOCUMENTS

| | | | |
|---|---|---|---|
| 5,481,194 A * | 1/1996 | Schantz et al. ............... 324/522 |
| 5,666,406 A * | 9/1997 | Sutherland et al. ...... 379/399.01 |
| 5,737,168 A * | 4/1998 | Baker ........................... 361/90 |
| 5,802,151 A * | 9/1998 | Bevill et al. ............... 379/93.05 |
| 6,188,764 B1 * | 2/2001 | Huang et al. .................. 379/412 |
| 6,282,271 B1 * | 8/2001 | Gutzmer et al. ........... 379/93.05 |
| 6,611,208 B1 * | 8/2003 | Ketler ........................... 340/632 |
| 6,738,474 B1 * | 5/2004 | Miller ....................... 379/413.03 |
| 6,824,312 B2 * | 11/2004 | McClellan et al. ............. 385/88 |
| 7,224,947 B2 * | 5/2007 | Sit et al. ....................... 455/90.3 |
| 8,199,905 B1 * | 6/2012 | Barrett et al. ............ 379/387.01 |
| 2005/0029963 A1 | 2/2005 | Lee |
| 2009/0123116 A1 | 5/2009 | Tanaka et al. |
| 2009/0219703 A1 | 9/2009 | Ishii et al. |
| 2011/0063768 A1 * | 3/2011 | Sexton et al. .................... 361/79 |
| 2012/0194969 A1 * | 8/2012 | Johnsen ........................ 361/646 |

\* cited by examiner

*Primary Examiner* — Binh Tieu
(74) *Attorney, Agent, or Firm* — Maynard, Cooper & Gale, P.C.; Jon E. Holland (57) ABSTRACT

Embodiments of the present disclosure generally pertain to systems and methods for providing notifications of hazardous ground conditions in telecommunication equipment. A system in accordance with an exemplary embodiment of the present disclosure comprises a control module positioned within a chassis at a network facility. The control module communicates with a plurality of access modules through a backplane of the chassis. At least one of the modules, such as the control module, comprises a voltage sensing element, control logic, and a user interface. The voltage sensing element is configured to measure a potential voltage difference between chassis ground and digital ground and determine whether such voltage difference is hazardous. The control logic is configured to monitor the voltage sensing element and provide an alarm via the user interface when the hazardous condition is present. Accordingly, a user is notified of the hazardous condition and the likelihood of equipment damage, loss of service, and personal injury are reduced.

15 Claims, 9 Drawing Sheets

SYSTEMS AND METHODS FOR PROVIDING NOTIFICATIONS OF HAZARDOUS GROUND CONDITIONS IN TELECOMMUNICATION EQUIPMENT

RELATED ART

Telecommunication equipment is typically inserted into a chassis at a network facility, such as, for example, a central office. Telephone switching systems typically have multiple ground nodes. One ground node, referred to as "chassis ground," generally refers to a node that is coupled to a frame of the chassis. Another ground node, referred to as "digital ground," generally refers to a reference used for digital signals being communicated.

When equipment is installed correctly, there is little or no potential difference between chassis ground and digital ground. However, mistakes are occasionally made during installation wherein the negative terminal of a system battery is connected to chassis ground. When this erroneous connection occurs, a potential difference of approximately 48 Volts (V) exists such that any subsequent electrical path that develops between chassis ground and digital ground allows a hazardous and essentially unlimited amount of current to flow through the electrical path. Such current is capable of damaging equipment, interrupting service, and injuring people.

Typical solutions for mitigating such damage involve identifying particular electrical paths which are likely to form between chassis ground and digital ground and protecting those paths from the hazardous electrical current. However, such solutions fail to protect less common or unanticipated electrical paths which may form between the chassis ground and the digital ground. Thus, a hazardous condition exists for a number of uncommon electrical paths which may form between chassis ground and digital ground, and such condition is ignored by typical solutions. Accordingly, equipment damage, loss of service, and personal injury remain a possibility when an erroneous battery connection occurs in a telephone switching system.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure.

Furthermore, like reference numerals designate corresponding parts throughout the several views.

DETAILED DESCRIPTION

Embodiments of the present disclosure generally pertain to systems and methods for providing notifications of hazardous ground conditions in telecommunication equipment. A system in accordance with an exemplary embodiment of the present disclosure comprises a control module positioned within a chassis at a network facility. The control module communicates with a plurality of access modules through a backplane of the chassis. At least one of the modules, such as the control module, comprises a voltage sensing element, control logic, and a user interface. The voltage sensing element is configured to measure a potential voltage difference between chassis ground and digital ground and determine whether such voltage difference is hazardous. The control logic is configured to monitor the voltage sensing element and provide an alarm via the user interface when the hazardous condition is present. Accordingly, a user is notified of the hazardous condition, and the likelihood of equipment damage, loss of service, and personal injury is reduced.

Figure 1:
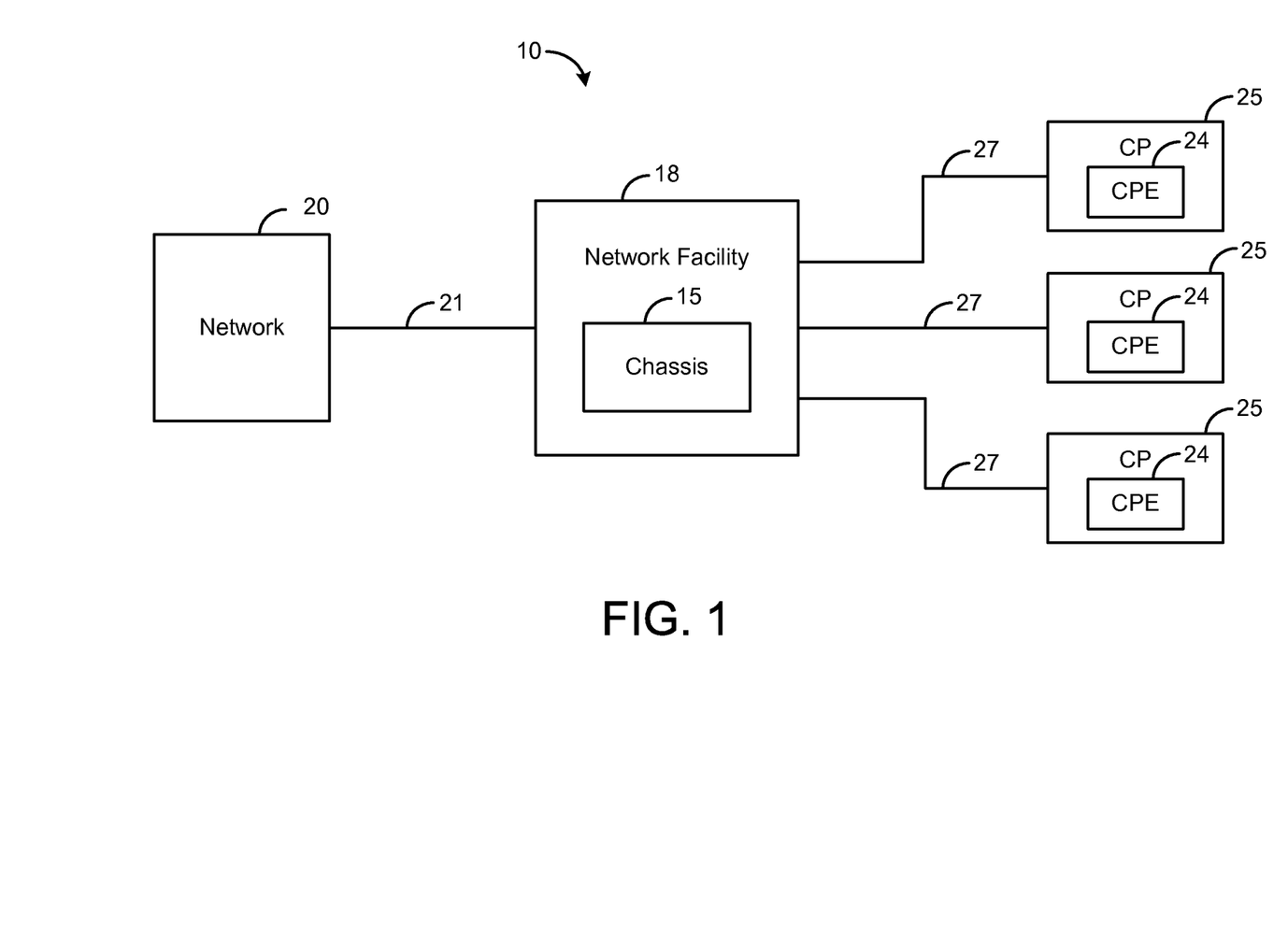
FIG. 1 is a block diagram depicting an exemplary embodiment of a communication system.

FIG. 1 depicts an exemplary embodiment of a communication system 10. The communication system 10 comprises a chassis 15 located at a network facility 18, such as a central office. As will be described in more detail hereafter, telecommunication equipment in the chassis 15 is coupled to a network 20 via a network connection 21 and to customer premises equipment 24 located at customer premises 25 via a plurality of subscriber lines 27. The chassis 15 houses a plurality of network access devices and a control module (not shown in FIG. 1), discussed in more detail hereafter, which facilitate communication between one or more networks 20 as well as communication between the networks and customer premises equipment 24.

Figure 2:
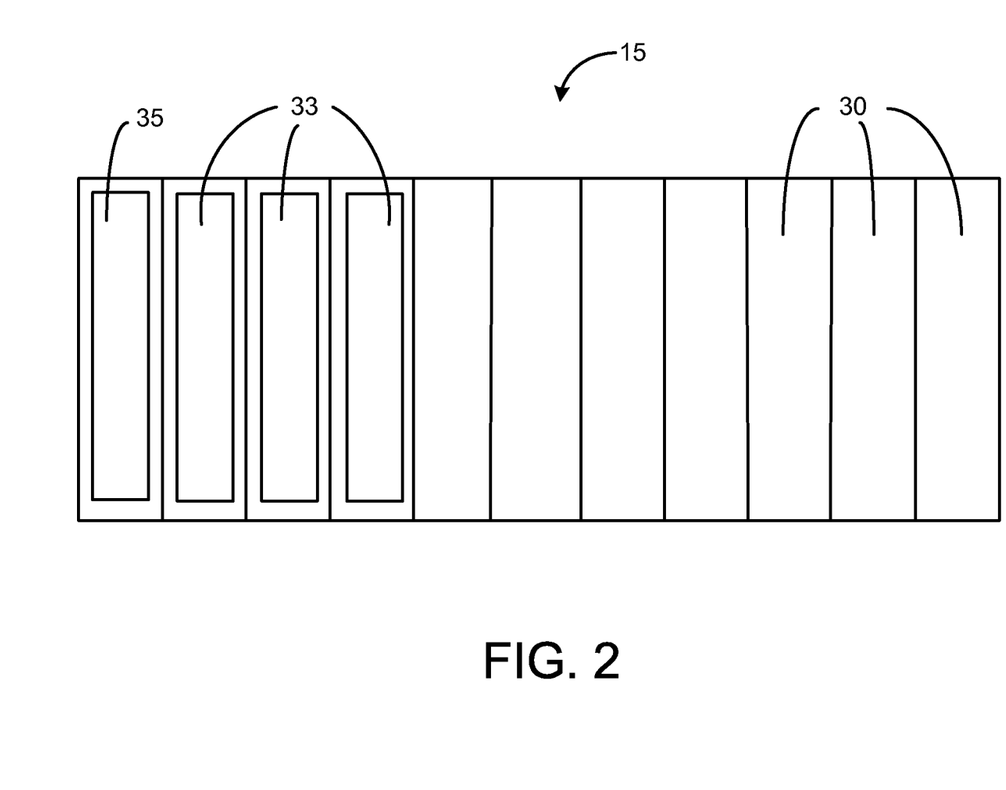
FIG. 2 depicts an exemplary chassis, such as is depicted by FIG. 1, supporting interconnection of a control module and a plurality of network access devices.

FIG. 2 depicts an exemplary embodiment of the chassis 15 for housing telecommunication equipment modules, such as access modules 33 or control modules 35. As shown by FIG. 2, the chassis 15 has a plurality of slots 30 for interconnecting a plurality of access modules 33 and at least one control module 35. An access module 33 represents one member of a potentially large family of access equipment types which can function in the chassis 15. For example, one type of access module 15 is coupled to and terminates at least one respective subscriber line 27 extending to at least one customer premises 25. Additionally, a different type of access module 15 may be coupled to and terminate a network 20. A data signal received from a subscriber line 27 by an access module 33 is demodulated to recover data carried by the signal, and the recovered data may be transmitted to at least one other module in the chassis 15. An access module 33 may also receive data destined for CPE 24 at a customer premises 25. One type of access module 33 is configured to modulate a signal with CPE bound data and to transmit the signal across a subscriber line 27 to such CPE 24. The access modules may comprise switches, routers, multiplexers, or other network equipment for handling data communicated with the CPE 24 or between networks.

Figure 3:
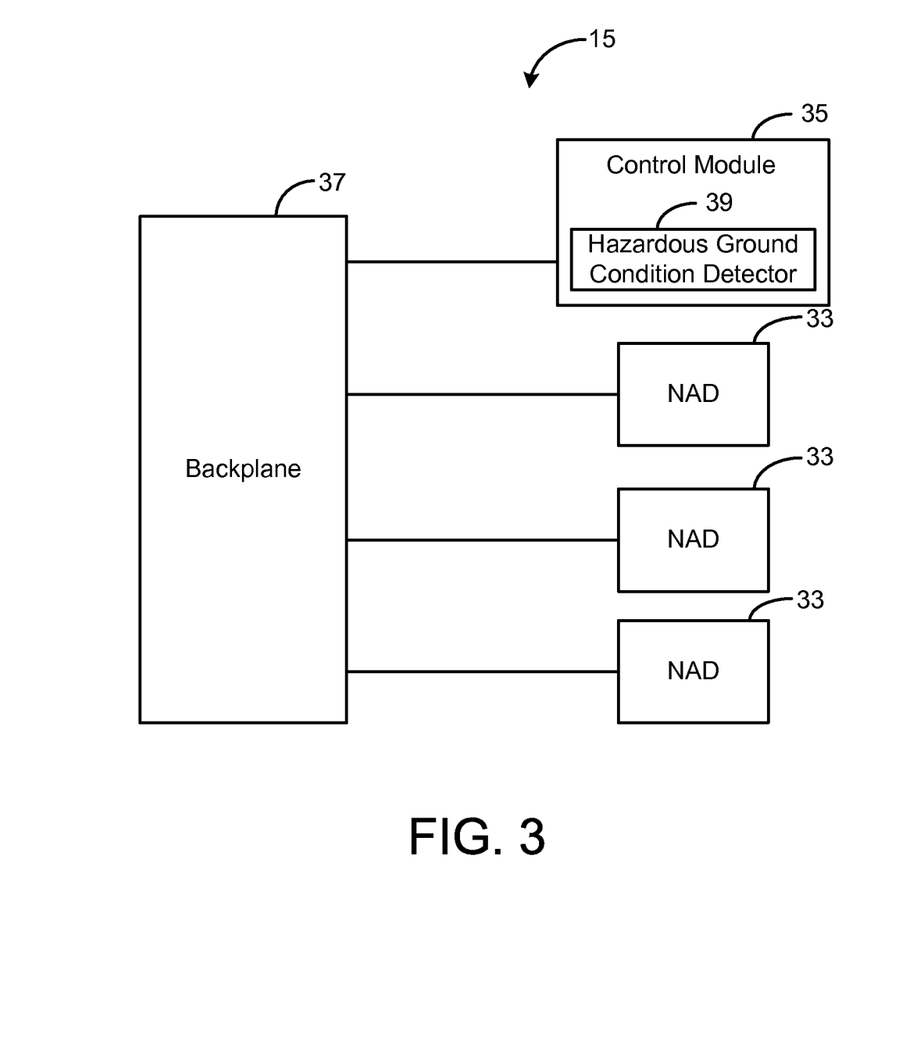
FIG. 3 is a block diagram depicting the control module of FIG. 2 in communication with the network access devices through a chassis backplane.

In one embodiment, each of the access modules 33 and the control module 35 is positioned within a respective slot 30 of the chassis 15, but other locations for the modules 33 and 35 are possible in other embodiments. The control module 35, discussed in more detail hereafter, is configured to communicate with the access modules 33. In this regard, as shown by FIG. 3, the chassis 15 has a backplane 37 that conductively couples the access modules 33 and the control module 35 to one another thereby enabling communication among the access modules 33 and the control module 35. The access modules 33 and the control module 35 conductively couple to the backplane 37 via their respective backplane connectors (not shown in FIG. 3), discussed in more detail hereafter. In one exemplary embodiment, the control module 35 is configured to communicate with each of the access modules 33 in the chassis 15 via the backplane 37 and to allow maintenance personnel to gain access to the communication system 10 via a maintenance device (not shown in FIG. 3), discussed in more detail hereafter. As an example, maintenance personnel may detachably couple a user interface device, such as a lap-top computer or personal digital assistant (PDA), to the control module 35 and provide configuration inputs for provisioning one or more of the access modules 33 through the control module 35.

As shown by FIG. 3, the control module 35 comprises a hazardous ground condition detector 39 that is configured to detect when there is a significant difference between digital ground and chassis ground, as will be described in more detail hereafter. In other embodiments, the hazardous ground condition detector 39 may be located elsewhere, such as on any of the NADs 33 or directly on a frame of the chassis 15.

Figure 4:
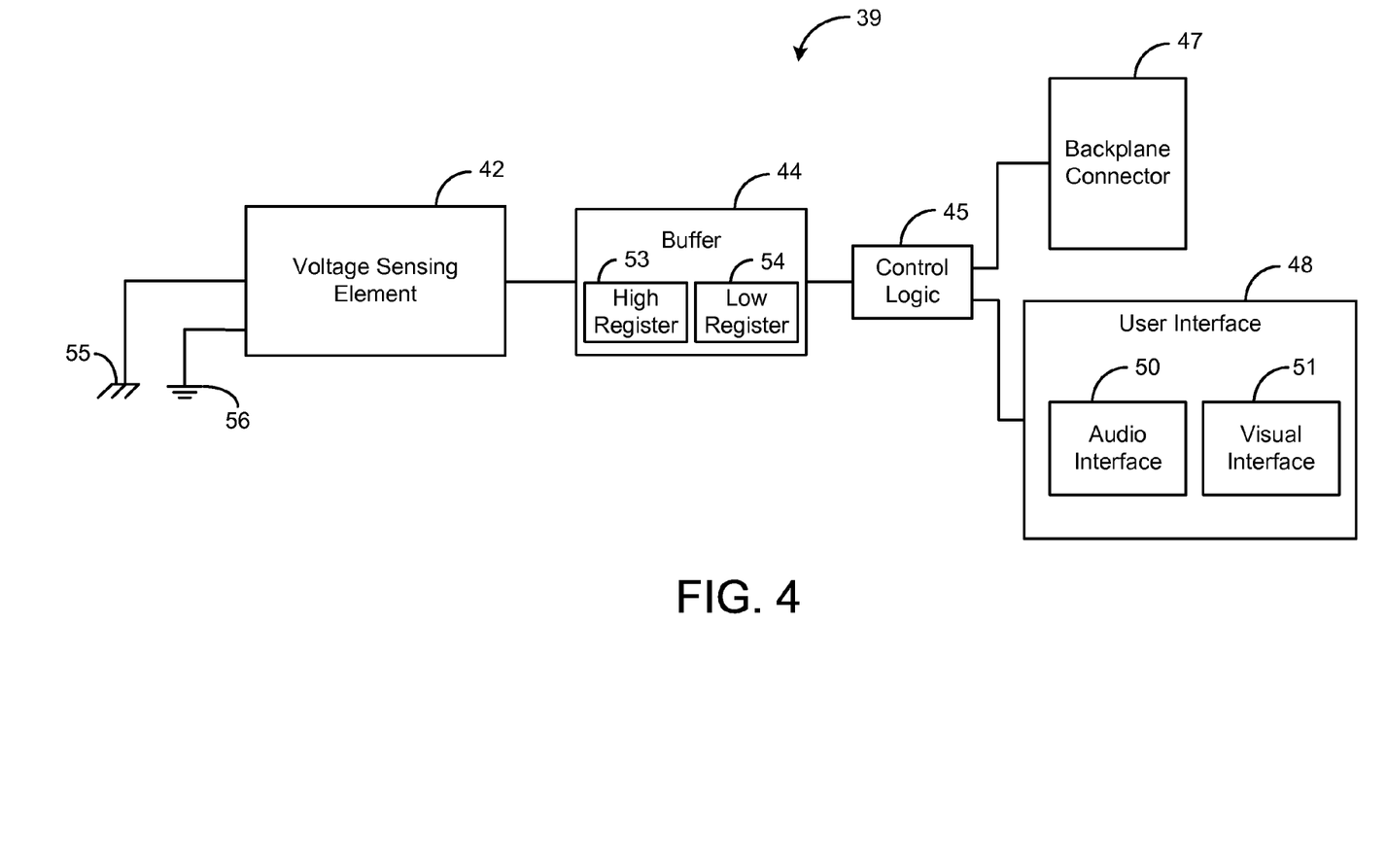
FIG. 4 is a block diagram depicting an exemplary embodiment of a hazardous ground condition detector, such as is depicted by FIG. 3.

FIG. 4 depicts an exemplary embodiment of the hazard ground condition detector 39 depicted by FIG. 3. The control module 35 includes a voltage sensing element 42, a buffer 44, control logic 45, a backplane connector 47, and a user interface 48. The user interface 48 comprises an audio interface 50 and/or a visual interface 51 for rendering a variety of audio and/or visual status signals to a user.

The voltage sensing element 42 is connected to a chassis ground 55 and a digital ground 56. The chassis ground 55 is conductively coupled to a frame of the chassis 15. In one embodiment, the control module 35 has a plurality of locations for connecting components (not shown) to the chassis ground 55. The digital ground 56 is the ground reference used by devices, such as, for example, the access modules 33 (FIG. 2), when the devices are communicating digitally. When a system battery (not shown) is correctly connected to the chassis ground 55, there is no potential voltage difference between the chassis ground 55 and the digital ground 56. However, when the negative terminal of the system battery (not shown) is connected to the chassis ground 55, an erroneous connection occurs such that there is a potential voltage difference between the chassis ground 55 and the digital ground 56. In one embodiment, such potential voltage difference is nominally 48 V, and typically 56 V. Such a large potential voltage difference between the chassis ground 55 and the digital ground 56 causes a hazardous condition wherein any subsequent electrical path which forms between the chassis ground 55 and the digital ground 56 is subject to an essentially unlimited amount of electrical current.

The voltage sensing element 42 is configured to detect a potential voltage difference between the chassis ground 55 and the digital ground 56. The voltage sensing element 42 is further configured to compare the chassis ground voltage to the digital ground voltage and determine whether such potential voltage difference constitutes a hazardous condition. The sensing element 42 makes such determination by comparing the potential voltage difference to a high threshold and a low threshold in order to determine whether the magnitude of the potential voltage difference is too high, such that a hazardous condition exists, and the sensing element 42 is further configured to transmit a status signal to the buffer 44 when a hazardous condition is detected. Specifically, the sensing element 42 transmits a status signal indicating that a hazardous condition is present if the potential voltage difference exceeds the high threshold or is below the low threshold, which corresponds to a negative voltage. In one embodiment, the high threshold is set at 8 V and the low threshold is set a −8 V. However, other threshold values are possible in other embodiments.

The buffer 44 is configured to receive and buffer the status signal from the voltage sensing element 42 indicating the potential voltage difference between chassis ground 55 and digital ground 56 and inform the control logic 45 when a hazardous condition is present. The buffer 44 is further configured to map the status signal and a plurality of other status signals into the address space of the control logic 45. In one embodiment, the buffer 44 comprises a register 53, referred to herein as the "high register," and a register 54, referred to herein as the "low register," wherein the high register 53 is set when the status signal indicates that the potential voltage difference exceeds the high and the low register 54 is set when the status signal indicates that the potential voltage difference is less then (more negative than) the low threshold. The control logic 45 then accesses the registers 53 and 54 in the buffer 44 to determine whether a hazardous condition is present. In other embodiments, the buffer 44 may send a signal to the control logic 45 indicating that a hazardous condition is present without setting registers in the buffer 44. If the potential voltage difference between the chassis ground 55 and the digital ground 56 is between the low and high thresholds, no hazardous condition exists and neither the high register 53 nor the low register 54 is set.

The control logic 45 is configured to facilitate communication between the control module 35 and the access modules 33 (FIG. 2) via the backplane connector 47. Note that the control logic 45 may be implemented in hardware, software, firmware, or any combination thereof. In one exemplary embodiment, the control logic 45 is implemented in software and stored within memory (not shown in FIG. 4) an instruction execution apparatus, such as a central processing unit (CPU) or digital signal processor (DSP), for executing instructions of the software.

The control logic 45 is further configured to access the buffer 44 and determine whether a hazardous ground condition exists. In one exemplary embodiment, the control logic 45 reads the high register 53 and the low register 54 of the buffer 44 in order to determine whether either register 53 or 54 indicates that a hazardous condition is present. If the high register 53 or low register 54 of the buffer 44 is set thereby indicating that a hazardous condition exists, the control logic 45 transmits an alarm signal to the user interface 48 in order to alert personnel of such hazardous condition. The alarm signal may comprise an audio signal which is communicated to the personnel via the audio interface 50, a visual signal communicated to the personnel via the visual interface 51, or a combined audio and visual signal which is communicated to the personnel via the audio interface 50 and the visual interface 51. In one exemplary embodiment, the visual interface 51 comprises a plurality of indicator lights (not shown in FIG. 4), such as light emitting diodes (LEDs), on a faceplate (not shown in FIG. 4) of the control module 35 and the alarm signal causes the indicator lights to flash in an unusual and distinctive pattern, which is not typical for normal operation of the module 35, in order to get the attention of a person in close proximity to the control module 35. In other embodiments, other alarm signals and techniques for alerting users to the detected hazard are possible. In other embodiments, the hazardous condition detection can be communicated to other locations using maintenance and status packets on a network. As an example, the control logic 45 may be configured to transmit a message through the backplane 37 and network 20 to maintenance personnel at a location remote from the chassis 15 to notify such personnel of the hazardous condition.

Figure 5:
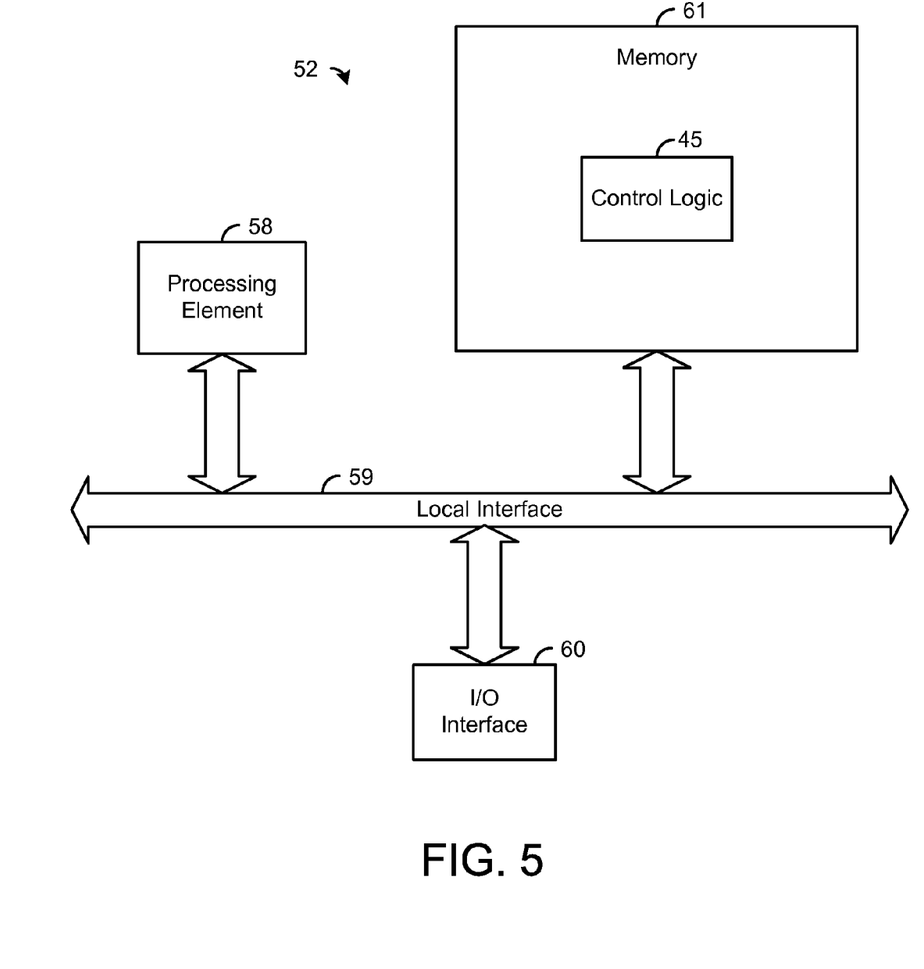
FIG. 5 is a block diagram depicting an exemplary embodiment of an instruction execution apparatus for executing control logic, such as is depicted in FIG. 4.

FIG. 5 depicts an exemplary embodiment of an instruction execution apparatus 52 for executing instructions of the control logic 45 when it is implemented in software. The apparatus 52 comprises at least one conventional processing element 58, such as a central processing unit (CPU), which communicates with and drives the other elements within the apparatus 52 via a local interface 59. Also, an input/output (I/O) interface 60, for example, data ports or pins, can be used to input data from the user and to output data to the user of the apparatus 52. In the embodiment depicted by FIG. 5, the control logic 45 is implemented in software and stored in memory 61. The control logic 45 is configured to access the buffer 44 (FIG. 4) to determine whether a hazardous chassis ground condition exists, and the control logic 45 is configured to send an alarm signal to the user interface 44 (FIG. 4) when such a condition is detected. In one embodiment, the alarm signal causes the indicator lights of the user interface 44 to blink in a distinctive and unusual pattern in order to get the attention of nearby personnel, but other alarm signals are possible in other embodiments.

Note that the control logic 45, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

Figure 6:
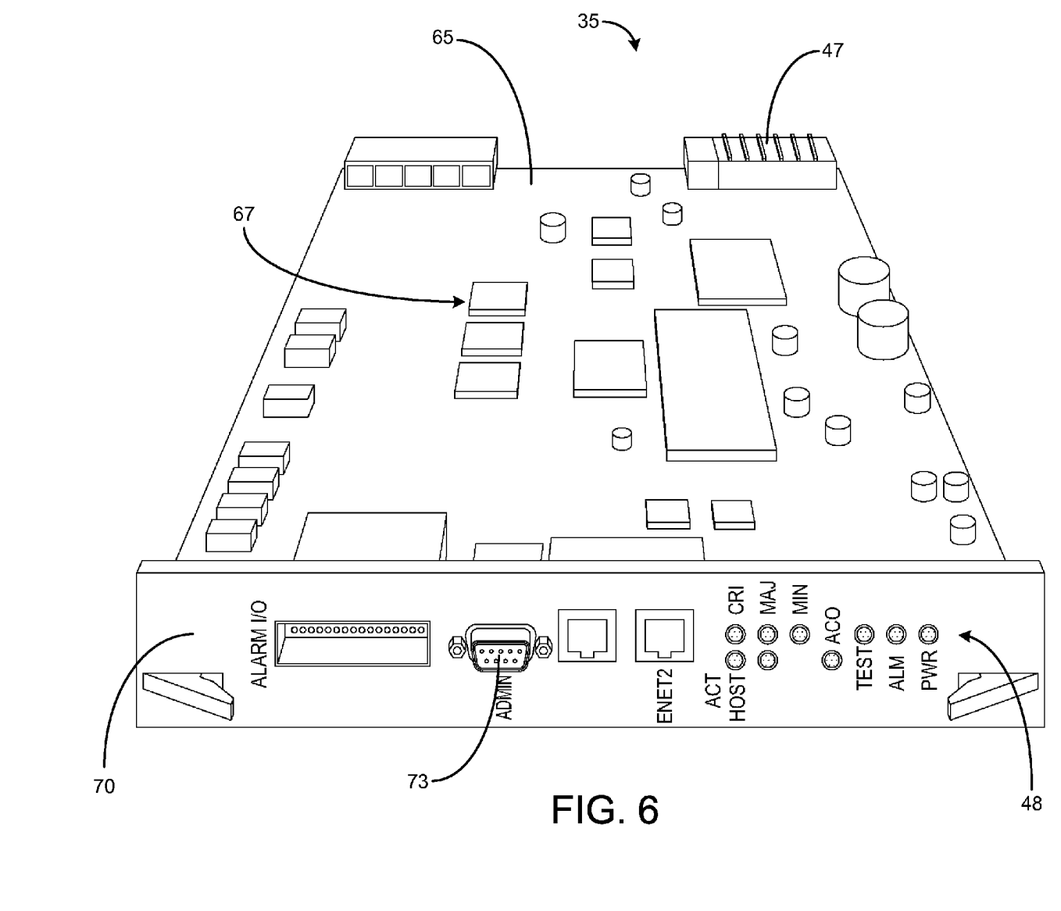
FIG. 6 is a top perspective view of an exemplary control module, such as is depicted by FIG. 2.

FIG. 6 depicts a top perspective view of an exemplary control module 35. In one embodiment, the control module 35 comprises a circuit board 65 having circuitry 67 and the backplane connector 47 implemented on the circuit board 65. The circuitry 67 may be configured to perform one or more functions, as may be desired, depending on the intended application. In one embodiment, the circuitry 67 transmits, receives, and processes data signals for use by the access modules 33 (FIG. 3), the customer premises equipment 24, and the network 20. In one embodiment, the circuitry 67 comprises the voltage sensing element 42 (FIG. 4), the buffer 44 (FIG. 4), and the control logic 45 (FIG. 4). The backplane connector 47 conductively couples the control module 35 to the backplane 37 (FIG. 3) in order to facilitate communication between the control module 35 and the access modules 33 through the backplane 37. In one embodiment, the reference voltage for these backplane communications serves as a digital ground reference for the detector 39.

The control module 35 further comprises a faceplate 70 having the user interface 48 and an interface port 73. As described herein, the user interface 48 is configured to notify a user of a plurality of status and alarm conditions. In one embodiment, the interface port 73 allows a user device (not shown), such as, for example, a computer, to connect to and communicate with the control module 35. A user may connect the user input device to the interface port 73 in order to communicate with the control module 35 and manage the control module 35 and the access modules 33 (FIG. 3). In one embodiment, the interface port 73 comprises a DB9 port. However, different interface ports, such as, for example, a universal serial bus (USB) port, are possible in other embodiments.

Figure 7:
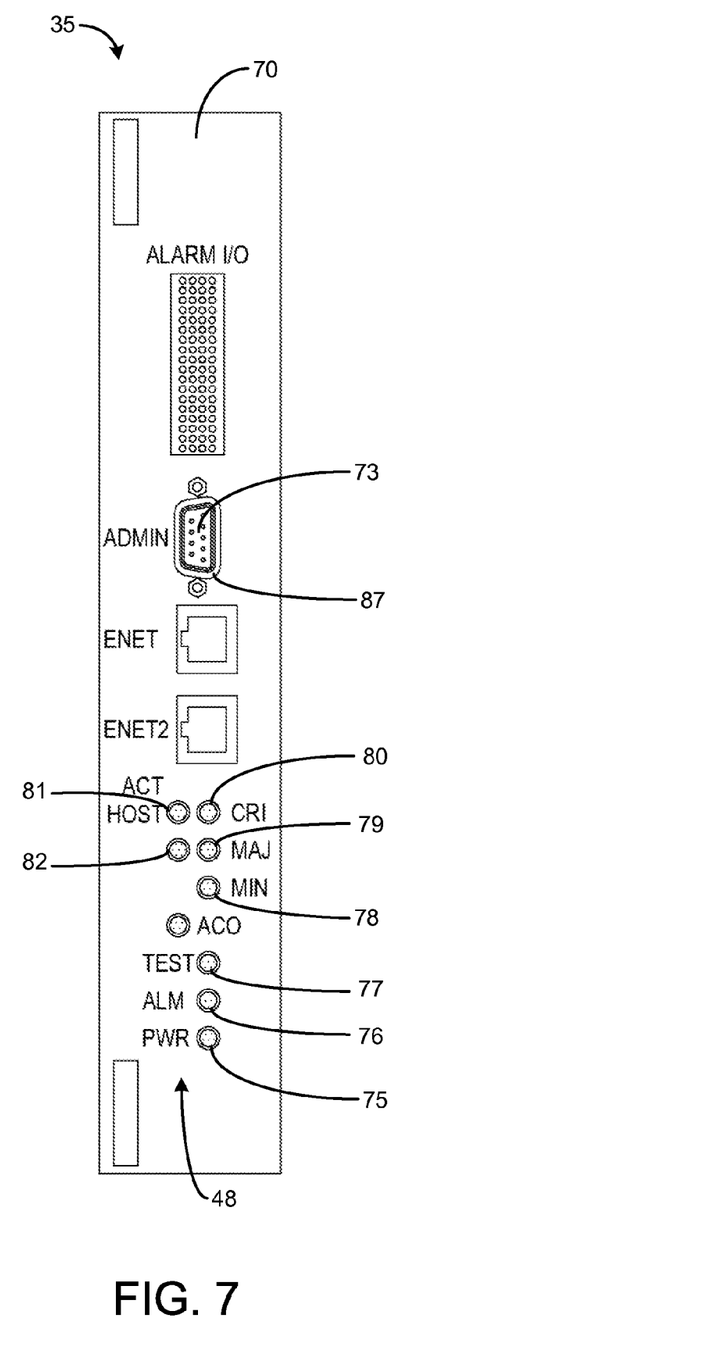
FIG. 7 is a front view of the faceplate of the control module of FIG. 6.

FIG. 7 depicts the faceplate 70 of the control module 35 of FIG. 6. As set forth above, the faceplate 70 comprises the interface port 73 and the user interface 48. In the embodiment depicted by FIG. 7, the user interface 48 comprises a plurality of indicator lights 75-82. In one embodiment, the control logic 45 (FIG. 4) activates and deactivates the indicator lights 75-82 to notify a user of a variety of status and/or alarm signals received by the buffer 44 (FIG. 4) of the control module 35. Each of the indicator lights 75-82 is respectively correlated with the status of a particular condition, and the control logic 45 controls the activation and deactivation of the indicator lights 75-82 depending on the status of each condition. The indicator lights 75-82 notify the user of the status of a plurality of conditions such as power, alarms, tests, minimum level alarms, major level alarms, Ethernet circuit connection, Ethernet access of host, and alarm cutoff.

One or more of the indicator lights 75-82 is continuously activated such that light is constantly emitted when the corresponding condition is detected and is otherwise deactivated assuming that no hazardous condition regarding the voltage difference between chassis ground and digital ground has been detected. For example, in one embodiment, the indicator light 75, referred to as a power (PWR) indicator, is continuously activated without flashing such that light is emitted from the light 75 when power is being received from a power source (not shown), but the light 75 is deactivated such that no light is emitted when no power is being received from the power source. Other types of status indicators may be continuously activated without flashing for as long as the indicated status condition exists. In one embodiment, the control logic 45 transmits an alarm signal which causes each of the indicator lights 75-82 to flash in an unusual or atypical pattern when a hazardous ground condition is detected. Thus, for example, when the indicator light 75 flashes in an unusual pattern, a user is notified of a hazardous condition since the light 75 is typically either continuously activated or deactivated. Additionally, in normal operation, the status of the various lights are somewhat independent of each other and maintenance personnel are accustomed to observing the lights acting independently. Employing all of the lights together to sequence as a group additionally contributes to the uniqueness of the alarm state and thus serves to capture the attention of maintenance or installation personnel signaling that an unusual condition demands attention. However, in other embodiments, other user interfaces are possible, such as, for example, a single indicator light (not shown) which indicates whether a hazardous ground condition is present.

Note that the interface port 73 comprises a metallic housing 87 that is conductively coupled to the chassis ground 55 (FIG. 4). When a user input device, such as a computer, is connected to the interface port 73, an electrical path often forms between the chassis ground 55 and the digital ground 56 (FIG. 4). If the system battery (not shown) is erroneously connected to the chassis ground 55 such that potential voltage difference exists between the chassis ground 55 and the digital ground 56, a hazardous condition exists such that a high amount of electrical current flows through the electrical path. Such a high amount of electrical current may damage the user device (or other equipment), interrupt service, or injure personnel. Practitioners familiar with the art know that isolation is typically provided to isolate interface port 73 using such devices as optical couplers, capacitive couplers, inductive couplers, of couplers involving high resistance to mitigate the hazard associated with connecting devices to port 73. However, while these prior art techniques protect specific points of anticipated connection from hazardous chassis ground conditions, it should be noted that the prior art fails to make known the underlying existence of the hazardous condition. Furthermore, it can be argued that by protecting the points of anticipated connection from hazardous chassis ground conditions, the prior art techniques only serve to "cover up" the hazardous condition until an inadvertent and unanticipated connection is made between chassis ground and digital ground.

Figure 8:
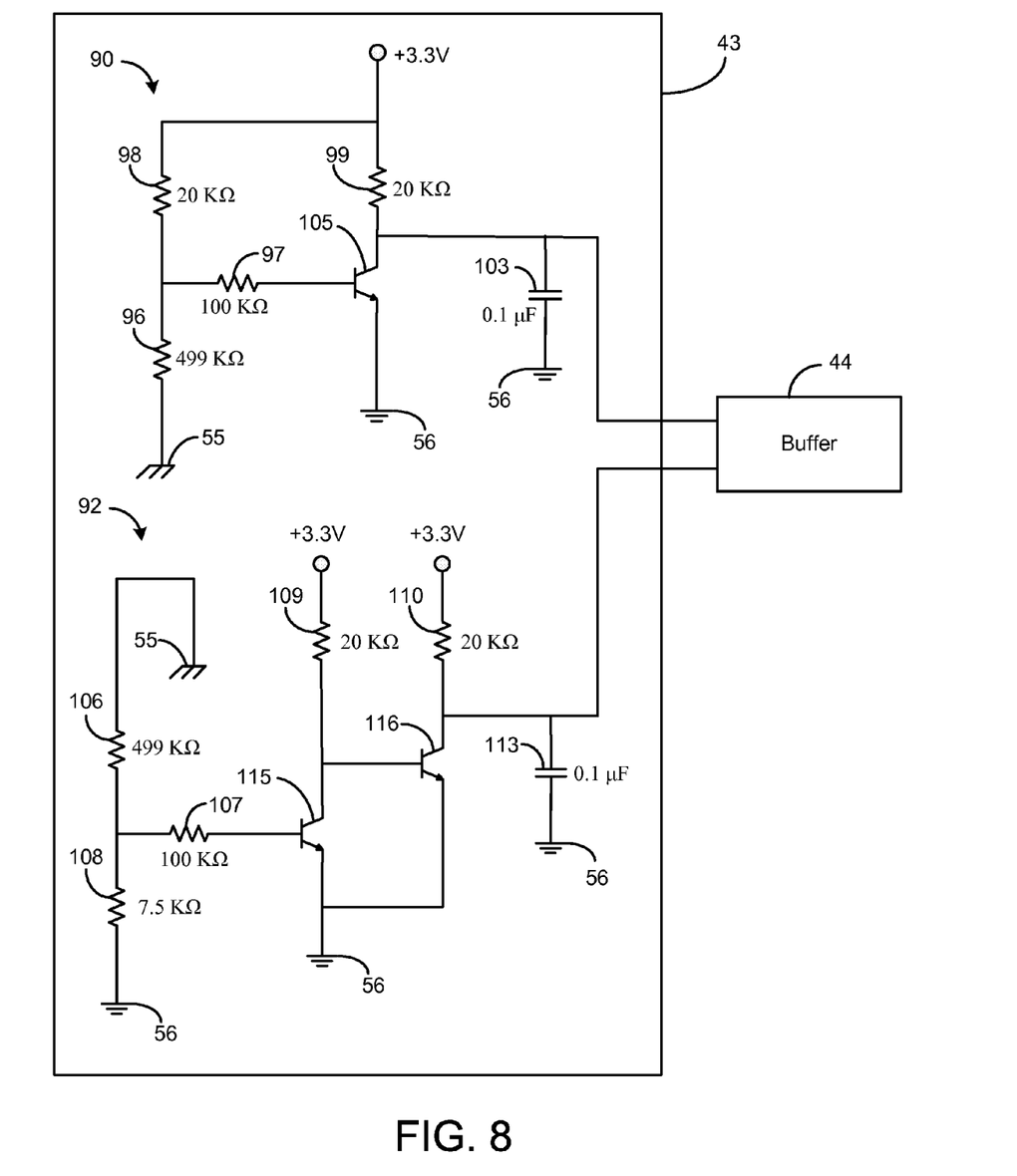
FIG. 8 is a circuit diagram depicting an exemplary embodiment of a voltage sensing element, such as is depicted by FIG. 4.

FIG. 8 is a circuit diagram depicting an exemplary embodiment of the voltage sensing element 42 of FIG. 4. In one embodiment, the voltage sensing element 42 comprises a circuit 90 for detecting a low hazardous chassis ground voltage (relative to digital ground) and a circuit 92 for detecting a high hazardous chassis ground voltage (relative to digital ground). As shown by FIG. 8, the circuit 90 comprises a plurality of resistors 96-99, a capacitor 103, and a transistor 105. In one embodiment, the resistor 96 has a resistance of 499 kilo-Ohms (KΩ), the resistor 97 has a resistance of 100 KΩ, and the resistors 98 and 99 have a resistance of 20 KΩ. Furthermore, the capacitor 103 has a capacitance of 0.1 micro-Farads (μF). This capacitor 103 only serves to suppress noise on the detection signal and in many implementations, the signal will be sufficiently quiet without the capacitor 103, which can be omitted. Transistor 105 is rated for 300 V due to its exposure to the chassis ground voltage. The circuit 90 is configured to determine the potential voltage difference between the chassis ground 55 and the digital ground 56. The sensing element 42 (FIG. 4) then determines whether the chassis ground voltage is too low as compared to the digital ground voltage such that a hazardous condition exists. If a hazardous condition is detected, the element 42 transmits a status signal to the buffer 44 indicating a hazardous condition is present.

The circuit 92 comprises a plurality of resistors 106-110, a capacitor 113 and a plurality of transistors 115 and 116. In one embodiment, the resistor 106 has a resistance of 499 KΩ, the resistor 107 has a resistance of 100 K≠, the resistor 108 has a resistance of 7.5 KΩ, and the resistors 109 and 110 have a resistance of 20 KΩ. The capacitor 113 has a capacitance of 0.1 μF, and like capacitor 103, may not be necessary in low noise environments. The transistor 115 is rated for 300 V due to its exposure to the chassis ground voltage, and the transistor 116 is rated for 80 V. The circuit 92 is configured to compare the chassis ground voltage to the digital ground voltage and determine the potential voltage difference between them. The sensing element 42 (FIG. 4) then determines whether the chassis ground voltage is too high as compared to the digital ground voltage such that a hazardous condition exists. If the chassis ground voltage is too high, the sensing element 42 transmits a status signal to the buffer 44 indicating that a hazardous condition is present. Accordingly, the sensing element 42 transmits status signals to the buffer 44 when hazardous high or low voltages are detected. Other circuits for detecting hazardous high and low voltages are possible in other embodiments.

In one exemplary embodiment, assume that the control module 35 and a plurality of access modules 33 are positioned within the slots 30 of the chassis 15 and are conductively coupled via the backplane 37. Also assume that the control module 35 comprises the user interface 48 having the indicator lights 75-82. Further assume that the negative terminal of the system battery (not shown) is erroneously connected to the chassis ground 55 of the chassis 15 such that a potential voltage difference of 48 V exists between the chassis ground 55 and the digital ground 56.

Figure 9:
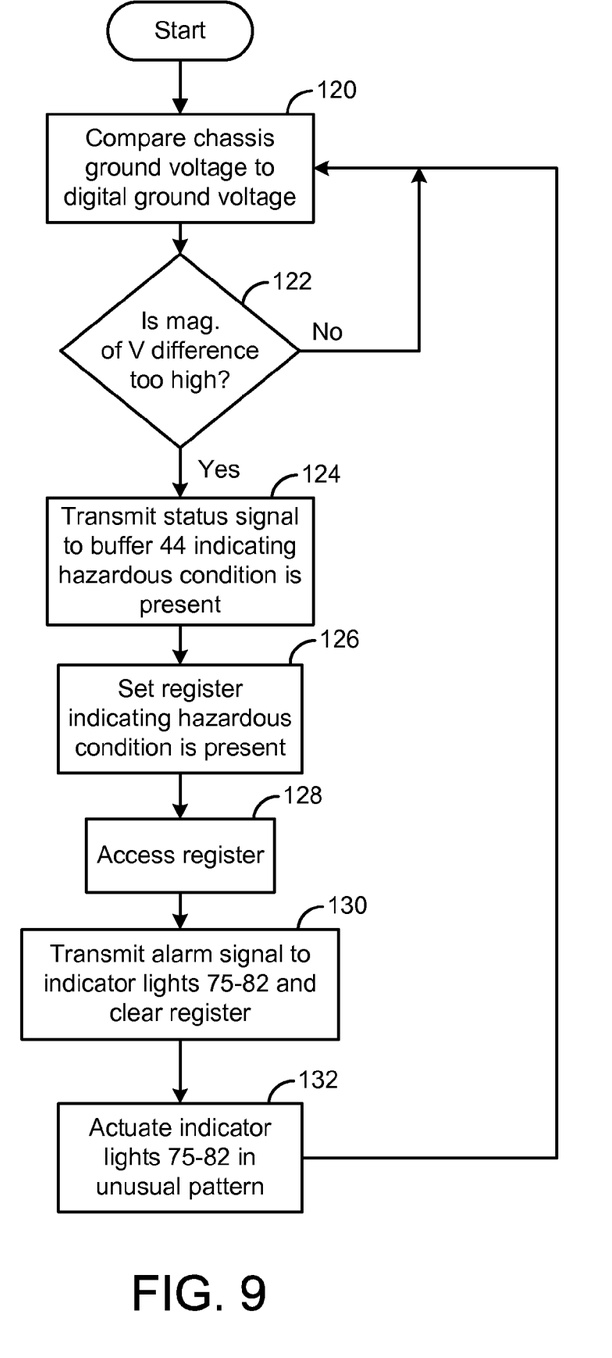
FIG. 9 is a flowchart illustrating an exemplary method of protecting a communication system from a hazardous ground condition.

When such an erroneous connection is made, the voltage sensing element 42 compares the chassis ground voltage to the digital ground voltage, as shown by block 120 of FIG. 9.

The voltage sensing element 42 then determines whether the magnitude of the potential voltage difference between the chassis ground 55 and the digital ground 56 is too high such that a hazardous condition exists, as shown by block 122. If the potential difference is between the high threshold and the low threshold, no hazardous condition exists and no status signal is transmitted to the buffer 44. If the potential difference exceeds the high threshold or is less than the low threshold, a hazardous condition exists and the voltage sensing element 42 transmits a status signal to the buffer 44 indicating that a hazardous condition is present, as shown by block 124. The buffer 44 then sets its high register 53 or low register 54 indicating that a high or low hazardous voltage, respectively, has been detected by the voltage sensing element 42, as shown by block 126. The control logic 45 accesses the registers 53 and 54 to determine whether a hazardous condition has been detected, as shown by block 128. If either of the registers 53 and 54 is set, the control logic 45 sends an alarm signal to the indicator lights 75-82 and in some embodiments, may clear the registers 53 and 54, as shown by block 130. The indicator lights 75-82 then cycle on and off in an unusual pattern to alert a user of the hazardous condition, as shown by block 132. Accordingly, the user may fix the hazardous condition thereby mitigating equipment damage, loss of service, and personal injury.

In several embodiments set forth above, the components (e.g., voltage sensing element 42 and control logic 45) for detecting a hazardous condition based on a voltage difference between chassis ground and digital ground are described as within a control module 35. However, any such components may be located elsewhere in other embodiments, such as within any of the access modules 33, or on the chassis backplane.

Now, therefore, the following is claimed:

1. A telecommunication equipment system for terminating at least one network connection or at least one subscriber line extending to at least one customer premises, the system comprising:
    a chassis housing at least one telecommunication equipment module that is coupled to and is configured to terminate the one network connection or the one subscriber line;
    a chassis ground conductively coupled to the chassis, wherein the chassis has a backplane;
    a digital ground providing a voltage reference for electrical signals within the system;
    a voltage sensing element configured to detect a potential difference between the chassis ground and the digital ground; and
    logic configured to communicate an alarm indicative of a hazardous condition based on a comparison of the potential difference to a threshold,
    wherein the digital ground provides a voltage reference for an electrical signal communicated across the backplane by the one telecommunication equipment module, and wherein the one telecommunication equipment module is conductively coupled via the backplane to at least one other telecommunication equipment module housed by the chassis.

2. The system of claim 1, further comprising a user interface coupled to the logic, the user interface configured to communicate the alarm indicative of the hazardous condition.

3. The system of claim 2, wherein the user interface comprises a visual interface for providing visual notification of the hazardous condition.

4. The system of claim 3, wherein the visual interface comprises a plurality of indicator lights.

5. The system of claim 4, wherein the logic is configured to provide the alarm by causing the plurality of indicator lights to cycle on and off.

6. The system of claim 2, wherein the user interface comprises an audio interface for providing audible notification of the hazardous condition.

7. The system of claim 2, wherein the user interface comprises a light indicator, and wherein the logic is configured to provide the alarm by activating the light indicator.

8. The system of claim 2, wherein the user interface comprises a plurality of light indicators, and wherein the logic is configured to provide the alarm by causing each of the light indicators to cycle on and off.

9. The system of claim 8, wherein each of the light indicators when activated without cycling indicates a status condition other than the alarm.

10. The system of claim 1, wherein the one telecommunication equipment module has a port for receiving a user input, and wherein the one telecommunication equipment module is configured to provision at least one other telecommunication equipment module housed by the housing.

11. A method for providing notice of hazardous conditions in telecommunication equipment terminating at least one network connection or at least one subscriber line extending to a customer premises, comprising:

signaling, via at least one telecommunication equipment module housed by a chassis, data with respect to a digital ground, the one telecommunication equipment module coupled to a chassis ground that is conductively coupled to the chassis, wherein the chassis has a backplane:

detecting a potential difference between the chassis ground and the digital ground;

comparing the potential difference to a threshold;

providing an alarm signal indicative of a hazardous condition based on the comparing; and communicating via the backplane an electrical signal between the one telecommunication equipment module and at least one other telecommunication equipment module housed by the chassis using the digital around as a voltage reference for the electrical signal.

12. The method of claim 11, wherein the providing comprises causing at least one indicator light to change state.

13. The method of claim 11, wherein the providing comprises emitting an audible signal.

14. The method of claim 11, wherein the providing comprises causing a plurality of light indicators to cycle on and off.

15. The method of claim 14, further comprising indicating a status condition, wherein the indicating comprises continuously activating at least one of the light indicators for as long as the status condition exists.

* * * * *